United States Patent Office 2,738,274
Patented Mar. 13, 1956

2,738,274

PRODUCING A GROWTH PROMOTING FACTOR

Elmer H. Le Mense, Muscatine, Iowa, assignor to Enzymes, Inc., Eagle Grove, Iowa, a corporation of Delaware No Drawing. Application December 4, 1951,
Serial No. 259,899

11 Claims. (Cl. 99—9)

This invention relates to ingredients for poultry and animal feeds and to a process for preparing such ingredients.

Under present practices for producing cereals and grasses and feeding thereof to poultry and animals, the supply of available protein is insufficient to properly balance the supply of carbohydrates. Thus, it has become general knowledge that in feeding livestock and poultry the feed supplies produced on most farms must be supplemented with other protein concentrates in order to obtain a sufficient feeding balance between proteins and carbohydrates. This demand for protein concentrates has increased tremendously in recent years and it is only through the increased production of soybean meal and the increased use of cotton seed meal that a semblance of balance between protein and carbohydrate has been maintained. However, the use of soybean meal alone as a supplement to livestock and poultry rations does not give satisfactory results as to weight gain, proper physical development and good reproduction qualities, and it has been found necessary to include certain other high quality protein-containing materials such as meat scraps, tankage, fish meal and fish solubles.

While fish solubles are rated among the best in supplemental value, the product is not freely used by feed mixers because of the difficulties encountered in incorporating the liquid or syrupy material into the feed mix. Furthermore, the total yearly supply of fish solubles and fish meal is on the decline. Similarly, the total supply of meat by-products is dwindling in the face of an ever increasing demand and recently a very acute shortage of both meat and fish by-products has developed throughout the world.

It is now generally agreed among experts on the basis of population trends that the previous level of meat by-products for incorporation in feeds is not likely to be reached again. This has made necessary the search for new sources of materials that can be substituted for meat and fish by-products. It has been found that certain high protein products appear to have certain unclassified nutritional factors which make their use as protein supplements in feeds markedly more advantageous than other materials. For example, fish meal, fish solubles and liver extract are especially potent in these unclassified nutritional factors, as is indicated by feeding experiments with poultry and livestock. However, the supply of fish by-products is very short and increasing demand for the same has constantly outdistanced any seasonal increase in the fish supply. So, too, the possibility of obtaining an economic new source of lever extract or an increase in the present supply is very remote. Therefore, it is imperative, if these nutritional factors are to be available for livestock and poultry feeding, that new source of these factors be made available.

An object of this invention is to provide a poultry and animal feed ingredient which may be produced from readily available materials and which imparts marked growth-promoting qualities and, it appears also, health-promoting qualities, to a feed in which it is incorporated.

Another object is to provide a poultry and animal feed ingredient which may be produced from materials of vegetable origin and having nutritional qualities at least comparable to those of animal and fish-life products of the type heretofore employed as feed supplements.

A further object is to provide an ingredient for poultry and animal feeds derived from vegetable material and having properties which render it effective as an ample substitute for all or a portion of the animal or fish-life protein now commonly incorporated in feed mixtures to provide economical production of fowls and animals.

A still further object is to provide a poultry and animal feed ingredient having nutrient qualities at least comparable to animal and fish products of the type heretofore employed as feed supplements, and which may be prepared from one or more of a large number of readily available vegetable materials.

Still another object of the invention is to provide animal and poultry feed protein supplement having nutrient qualities at least comparable to animal and fish-life proteins and which is adapted to be readily incorporated in the feed mix.

Still a further object is to provide a method of preparing an ingredient for poultry and animal feeds which ingredient has nutrient qualities at least comparable to animal and fish-life proteins and which may be employed as a substitute for or supplement to animal or fish-life proteins such as heretofore commonly incorporated in feed mixtures.

A still further object is to provide a poultry and animal feed ingredient which may be produced from material of vegetable origin, and which has growth-promoting qualities heretofore found only in animal or fish life.

A still further object is to produce very economically a growth-promoting and health-promoting factor for poultry and animals consisting at least of vitamin $B_{12}$ and possibly one or more other presently unidentified growth-promoting and health-promoting factors.

A further object is the production by the cultivation of certain micro-organisms on a solid substrate of a growth-promoting and health-promoting factor for poultry and animals consisting at least of vitamin $B_{12}$ and possibly one or more other presently unidentified growth-promoting and health-promoting factors.

Other objects are to provide a poultry and animal feed ingredient which may be readily and economically prepared, which is capable of storage for long periods of time, and may be readily incorporated in feed mixtures; to provide a simple, inexpensive and effective process for producing from vegetable material a feed ingredient having nutrient qualities which render it suitable as a substitute for animal and fish-life ingredients in feeds; and to provide a feed ingredient which may be prepared from vegetable material and which imparts greatly improved growth-promoting and possibly health-promoting qualities to feeds which include soybean or other nutrient ingredients.

In accordance with the present invention a nutrient vegetable material as a substrate, having a suitable protein and carbohydrate content, is inoculated with suitable micro-organisms and is incubated under suitably controlled conditions to produce a feed ingredient which when incorporated in poultry or animal feed mixes imparts to the mix desirable growth-promoting properties. The finished product appears to contain vitamin $B_{12}$ and possibly one or more unidentified growth-promoting factors, producing, when incorporated in a feed, weight gain at least comparable to that produced by animal or fish-life products of the type heretofore employed as protein supplements in animal and poultry feeds; it therefore is suitable for incorporation in feeds either as a substitute for or supplement to animal and fish-life ingredients such as heretofore employed.

In the preferred embodiment of the invention, a substrate is prepared from one or more vegetable materials having a protein content of from around 2.5% to around 40% by weight and a carbohydrate content (nitrogen free extract) of from around 10% to around 50% by weight. While one or more mixtures of a large group of readily available vegetable materials are suitable, excellent results have been obtained by using one or more of the following materials: bran (wheat), middlings (wheat), red dog flour, alfalfa meal, soybean meal, distillers' solubles (from cereals or tubers), distillers' dried grains (from cereals or tubers), corn meal, peanut meal or flour, oat hulls, rice hulls, oatmeal, corn stalks (ground or shredded), corn cobs (ground), kudzu vines (ground or shredded), sorgo or sorghum stalks (ground or shredded), beet pulp (ground), soybean vines (ground), sweet potato vines (ground), sweet potatoes (chopped or ground), Irish potatoes (chopped or ground), cotton seed meal, and other like vegetable substances. It is important that the substrate contain sufficient nutrients to permit the micro-organisms to obtain a vigorous growth and it is desirable that the substrate be a material which itself is a nutrient for the poultry or animal to which the feed containing the ingredient is to be fed. It is also preferable that the substrate be a material which presents a relatively high ratio of surface area to volume in order to provide a desirably vigorous growth of micro-organisms.

The vegetable material which is to form the substrate is finely divided by shredding, chopping or grinding, and where two or more different materials are employed to form the substrate, they preferably are thoroughly mixed. The material is comminuted sufficiently to provide a substantial surface area and preferably to approximately the same degree of fineness as customary with feed ingredients. The material is sterilized, preferably after being comminuted, in order to prevent subsequent activity, during incubation, of any foreign bacteria or other organisms which may be present in the material forming the substrate and which may detrimentally affect the process. The mass of comminuted substrate is moistened with water to bring the moisture content of the mass within the range from around 20% to around 60% by weight. The moistened mass is then steamed or cooked at temperatures maintained between 150° and 212° F. Preferably it is steamed or cooked for approximately 30 minutes when this operation is carried out in a cooker. On the other hand, excellent results have been accomplished by treating thin layers of the massed material to direct injection of live steam for periods of as low as 5 minutes.

The substrate material is conditioned in order to insure the optimum growth of the micro-organisms and to this end the activity of the substrate is adjusted by the addition of salts or acids so that the pH of the material is the optimum for maximum growth of the micro-organisms. It has been found that, depending upon the nature of the micro-organisms, the optimum pH value will range from 5 to 8 and generally a neutral environment will produce optimum growth. Materials which have been found satisfactory for adjusting the pH are ammonium chloride, ammonium phosphate, calcium phosphate, magnesium phosphate, calcium chloride and calcium hydroxide. It has also been found desirable in some instances to add small quantities of readily available carbohydrate such as dextrose, sucrose or molasses. While the pH value of the substrate may be adjusted either before or after steaming or cooking, this step preferably is accomplished prior to steaming or cooking.

After steaming or cooking, the substrate is cooled to a suitable incubation temperature of around 80° to 100° F. and which may range as low as 70° F. It is then inoculated with a culture of a selected strain or strains of bacteria from one or more of the genera *Bacillus subtilis*, *Bacillus mesentericus* and *Bacillus vulgatus* or a selected strain or strains of Streptomyces; *Streptomyces griseus* and *Streptomyces olivaceous* give excellent results. The substrate may be inoculated with the micro-organisms in either dry or liquid cultures. Excellent results have been obtained by employing an aerated liquid culture medium consisting of 3% by weight of distillers' solubles, 1% by weight of ground corn, ½% by weight of dextrose, ½% by weight of calcium carbonate, and the remainder water, although many other materials may be employed. The moisture content of the inoculated substrate is adjusted to from around 35% to around 65% by weight and preferably around 55% by weight, by the addition of water.

The inoculated substrate is then incubated at a temperature suitable for growth of the micro-organisms, and preferably the optimum temperature, in order to obtain a good growth. The optimum incubation temperature for the bacteria has been found to be around 87° F. to 105° F. and for the Streptomyces around 80° F. Good results have been obtained at temperatures ranging from around 70° F. to around 130° F. The incubation is carried out in the presence of sufficient air to permit the desired growth of the micro-organisms and excellent results have been obtained by spreading the inoculated mass on trays in layers of from 1" to 4" in depth, which permits sufficient natural aeration.

The incubation is carried on for a period of time sufficient to effect the production of a completed material having the desired growth-promoting qualities. It has been found that the incubation should be carried out for a period sufficient to produce a well developed growth of micro-organisms throughout the substance. The incubation should be stopped when all growth factors desired are fully developed, and prior to excessive hydrolization of the substrate. The latter can best be determined by noting the evolution of ammonia from the incubating mass, although in practice preferably the incubation is stopped after a predetermined period of time, which time is previously determined by tests with particular materials and temperature conditions. Another index that the growth has proceeded sufficiently is the cessation of biological heat production. Generally the period of incubation ranges from 15 to 48 hours, which period, as can be appreciated, is dependent upon a number of factors such as the nature of the material forming the substrate, the incubation temperature, the moisture content of the substrate and the nature of the micro-organisms.

When the incubation has progressed for the desired length of time, the mass is carefully dried, either in the incubator or in a separate drier, preferably by forced air, to reduce the moisture content to around 14% or less by weight, the drying being carried out at temperatures insufficient to destroy the natural nutrients of the mass and the unidentified growth factors which are produced by the action of the microorganisms.

After drying, the product is ready for use unless it is deemed desirable to further improve the fineness by additional grinding. The ingredient may be mixed into any of the various feed formulae as a supplement, in a manner analogous to that in which fish meal and meat by-products have heretofore been incorporated and in approximately the same quantities, depending upon the use to which the feed is to be put. For example, where a feed mix heretofore has contained 3% fish meal and 3% meat by-products, 6% of the ingredients of the present invention may be incorporated in the same formula in substitution for the fish meal and meat by-products; in certain cases it has been found that equivalent results may be obtained by substituting a smaller proportion of the cultivation product for the fish-life or meat products.

By way of further exemplification of the invention several specific examples of the process of preparing feed ingredients in accordance with the invention are given.

Example I

A substrate was prepared consisting of a mixture of the following constituents, the coarse, solid materials having previously been reduced to a suitable degree of fineness.

| Ingredient | Amount |
|---|---|
| Soybean meal | lbs 25 |
| Wheat bran | lbs 10 |
| Rice hulls | lbs 10 |
| Red dog flour | lbs 5 |
| Sucrose | gms 100 |
| Calcium hydroxide | gms 100 |
| Water | qts 2 |

This mixture was cooked for 60 minutes by direct injection of steam into the mass and thereafter cooled to approximately 100° F. This mixture was then inoculated with 4 gallons of liquid bacterial culture including an active strain of Bacillus subtilis in a culture medium consisting of 2% soybean meal, ½% red dog flour, ½% sugar and the remainder water. The inoculated substrate was incubated for 48 hours at an incubator temperature maintained at 80° F. At the end of this time the incubation was stopped and the mass air dried to a moisture content of approximately 10% by weight.

The product resulting from the foregoing process was mixed into a typical, balanced chick feed formula in the amount of 5% by weight of the total formula. This ration was fed for a period of 42 days to chicks in pens. A basic feed formula including the typical formula to which ½% fish meal and ½% meat scraps were added was fed to a second group of chicks and a comparison formula including the typical formula to which was added 4% of fish meal and 4% of meat scraps was fed to a third group of chicks. The several groups of chicks were kept in pens, 40 chicks to the pen. Chicks in "R" pens were hatched from eggs laid by hens receiving a regular formula containing animal and fish proteins. Chicks in "D" pens were hatched from eggs laid by hens receiving no animal or fish proteins, thereby eliminating egg carry over in the chicks. The gain in grams for the feeding period of the chicks fed the three foregoing rations was as follows:

| Ration | Average Gain in Grams | |
|---|---|---|
| | "R" Pens | "D" Pens |
| Typical formula to which was added ½% fish meal and ½% meat scraps | 448 | 457 |
| Typical formula to which was added 4% fish meals and 4% meat scraps | 501 | 471 |
| Typical formula to which was added 5% of bacterial product, produced as above described | 572 | 539 |

Example II

A substrate was prepared consisting of a mixture of the following constituents ground to the desired degree of fineness:

| | Lbs. |
|---|---|
| Wheat bran | 15 |
| Sweet corn stalks | 15 |

To the above mixture were added 8 liters of 0.08 N hydrochloric acid and the mixture was cooked at a temperature in excess of 150° F. for a period of approximately an hour and thereafter cooled to 100° F. Thereafter 6 liters of liquid bacterial culture of Bacillus subtilis were added and the mixture incubated at 90° F. for two hours, after which the mixture was transferred to an incubator maintained at a temperature of approximately 70° F. and incubated for a period of 20 hours. The material was removed from the incubator and air dried to a moisture content of around 10% by weight and was then ready for incorporation in a feed.

A ration consisting of a typical, balanced turkey poult formula to which the bacterial product produced as above described was fed to a group of turkey poults for 42 days. A second ration consisting of the typical formula to which meat scraps were added, was fed to a second group of turkey poults and a third ration consisting of the typical formula to which fish meal was added, was fed to a third group of turkey poults. The groups of poults were kept in separate pens, 30 poults to the pen. Two test feedings were made with results as follows:

| Ration | Average Gain in Grams | |
|---|---|---|
| | First Trial | Verification |
| Ration including 5% meat scraps | 713 | 799 |
| Ration including 7% fish meal | 760 | 814 |
| Ration including 6% bacterial product | 813 | 820 |

Example III

A medium was prepared consisting of a mixture as follows:

| Ingredient | |
|---|---|
| Soybean meal | percent by weight 50.0 |
| Wheat bran | do 20.0 |
| Alfalfa meal | do 20.0 |
| Red dog flour | do 9.0 |
| Sucrose | do .5 |
| Calcium hydroxide | do .5 |
| Cobalt chloride | parts per million 1.50 |

The mixture of the above ingredients was dampened with about one third its weight of water and then cooked with steam, after which it was cooled to approximately 80° F. and inoculated with about 25% by weight of a liquid culture of Streptomyces. The liquid culture medium consisted of 2% soybean meal, 1.0% corn steep liquor, 1.0% dextrose and the remainder water. The inoculated substrate was incubated for 72 hours at 80° F. after which it was dried to a moisture content of around 10% by weight. The product of this process was found by microbiological assay to contain a vitamin $B_{12}$ potency of 2.0 to 2.5 micrograms per gram of dry material.

It will be understood that any of the foregoing specific substrates or any other substrate prepared in accordance with the teachings hereinbefore set forth may be employed with any of the micro-organisms set forth to produce the growth-promoting factor of this invention.

The invention contemplates the cultivation of the micro-organisms on a medium which is essentially of a solid nature as contrasted with an essentially liquid medium, although the medium may contain a relatively high proportion of liquid and may be of a semi-solid consistency. It will be understood therefore that the terms "essentially solid medium" and "essentially solid substrate" used in the description and claims include media which are of either a solid or a semi-solid nature.

The feed ingredient of the present invention also has been found to have marked growth-promoting qualities and to be highly effective as a feed supplement for animal feeds and especially in feeds for non-ruminants, such as hogs.

It will be seen from the foregoing that the present invention provides a poultry and animal feed ingredient which when incorporated in feed formulae produced a ration which has nutrient characteristics or qualities equivalent, and in some cases superior, to those of rations containing generally equivalent or less quantities of fish meal or meat scraps or both. It will be apparent, therefore, that the ingredient consisting of the product produced by the present invention is an ample substitute for fish or animal products. Furthermore, the product has a supplementing action on meat and fish products which makes it valuable not only as a replacement for, but as an improvement over, fish and meat by-products when used in feed mixtures. The new product not only makes the feed mixture in which it is incorporated more effective in producing weight gain when fed to poultry and animals but makes possible the use of certain protein materials as protein supplements which heretofore were inefficient to use. The use of the material permits the preparation of feeds with no animal or fish-life by-products or considerably less of such products than heretofore found necessary.

This new feed ingredient being of such nature that it may be produced from any one of a large number of readily available materials is, therefore, readily obtainable and may be made available in relatively large quantities. The process of producing the new ingredient is simple and economical and, therefore, the ingredient may be produced on an economic basis at least as satisfactorily as animal and fish-life products heretofore employed as ingredients in poultry and animal feeds.

The feed ingredient produced in accordance with the present invention appears to embody an unidentified growth factor which produces the desirable weight gain in poultry and animals and which appears to function also as a health-promoting factor. The factor has not been fully identified but it is believed to consist of vitamin $B_{12}$ and possibly one or more other presently unknown growth-promoting and health-promoting factors.

The feed ingredient is chemically stable and capable, therefore, of being stored under customary conditions without deterioration or loss of effectiveness as a feed ingredient and as a growth-promoting material. It does not require special packaging or storage under special conditions. Moreover, it is of such nature that it may be readily ground or otherwise comminuted and may be mixed readily in customary feed formulae and no re-education of the users is required in respect to the storage or utilization of this material. The nature of the material permits it to be readily formed into pellets which form is often found desirable for mixing the material with other components of a feed mix and also for packaging the material for storage and handling.

The feed ingredient of this present invention has been found to be especially efficacious in diets containing soybean meal. However, it is useful in many other diets which do not include soybean meal as a constituent.

The cultivation of micro-organisms on a solid substrate, in accordance with the present invention is economical to carry out and the resulting product permits an economical feed mix, since the substrate is a material which is a nutrient for the poultry or animal. Moreover, the process may be practiced with relatively simple and inexpensive equipment, which equipment may be such as requires no presently critical materials in its construction. The product is ready for use without concentration and thus the variations which might result from concentration do not result.

This application is a continuation-in-part of my copending application Serial No. 19,637, filed April 7, 1948, for Ingredients for Poultry and Animal Feeds and Process for Preparing the Same.

I claim:

1. A process of producing a growth-promoting factor which comprises the steps of inoculating a moist, nutrient medium with one or more strains of bacteria selected from the group consisting of *Bacillus subtilis, Bacillus mesentericus,* and *Bacillus vulgatus,* allowing the bacteria to grow aerobically in the medium for a period of time of from about 15 to 72 hours at a temperature within the range 70° F. to 130° F., and thereafter recovering the growth-promoting factor resulting from the action of the micro-organisms.

2. The process of preparing a poultry and animal feed ingredient which comprises inoculating with one or more strains of bacteria selected from the group consisting of *Bacillus subtilis, Bacillus mesentericus* and *Bacillus vulgatus,* a culture medium including a nutrient material having a protein, carbohydrate and moisture content sufficient to support the growth of the said bacteria thereon, incubating the inoculated medium for a period of from about 15 hours to about 72 hours at a temperature of from about 70° F. to about 130° F. in the presence of sufficient air to support the growth of said bacteria, and then inhibiting further growth of said bacteria.

3. The process of preparing a poultry and animal feed ingredient which comprises preparing a culture medium comprising a protein-and-carbohydrate-containing material, water, and a growth-accelerating substance effective to adjust the pH value of the substrate to from around 5 to around 8, inoculating the substrate with one or more strains of micro-organisms selected from the group consisting of *Bacillus subtilis, Bacillus mesentericus* and *Bacillus vulgatus,* incubating the inoculated substrate aerobically at a temperature of from about 70° F. to about 130° F. for at least about 15 hours, and then inhibiting further growth of the micro-organisms prior to substantial hydrolyzation of the vegetable material.

4. The process of preparing a poultry and animal feed ingredient which comprises inoculating with a substantially pure culture of one or more strains of microorganisms selected from the group consisting of *Bacillus subtilis, Bacillus mesentericus,* and *Bacillus vulgatus,* a sterile protein-and-carbohydrate-containing substrate, aerobically incubating said inoculated substrate at a temperature of from about 70° F. to about 130° F. to produce vigorous growth of said bacteria on said substrate and development of a factor producing growth markedly in excess of that produced by the substrate material alone, and prior to substantial hydrolyzation of said substrate as evidenced by the evolution of ammonia, drying said inoculated substrate and bacteria and said growth-producing factor resulting from the growth of said bacteria to a moisture content below that which will support growth of the bacteria, said drying being effected at a temperature below that which will destroy said growth-producing factor.

5. The process of preparing a poultry and animal feed ingredient which comprises inoculating a substrate comprising vegetable material having a protein content of at least 2.5% by weight and a carbohydrate content (nitrogen free extract) of at least 10% by weight with one or more strains of bacteria selected from the group consisting of *Bacillus subtilis, Bacillus mesentericus* and *Bacillus vulgatus,* incubating the inoculated substrate for a period of from around 15 hours to around 48 hours at a temperature of from around 70° F. to around 130° F. in the presence of sufficient air to promote the growth of said bacteria and with the mass of inoculated substrate having an initial moisture content of from around 35% to around 65% by weight of water, and then drying the mass at a temperature insufficient to destroy the nutrient and growth-promoting characteristics thereof, to reduce the moisture content to around 14% by weight.

6. The process of preparing a poultry and animal feed ingredient which comprises comminuting vegetable material having at least 2.5% protein content and at least 10% carbohydrate content (nitrogen free extract), adjusting the moisture content of the material to from around 20% to around 60% by weight, sterilzing said material, adjusting the pH value of the material to from around 5 to around 8, then inoculating said material with one or more strains of bacteria selected from the group consisting of *Bacillus subtilis, Bacillus mesentericus,* and *Bacillus vulgatus,* adjusting the moisture content of the inoculated material to from around 35% to around 65% by weight, aerobically incubating the inoculating material for a period of from around 15 hours to around 48 hours at a temperature of from around 70° F. to around 130° F., and then drying the inoculated substrate and the product of the bacterial growth to reduce the moisture content to not substantially in excess of 14% by weight.

7. The process of preparing a poultry and animal feed ingredient which comprises inoculating a moist, essentially solid substrate comprising one or more materials selected from the group consisting of wheat bran, wheat middlings, red dog flour, alfalfa meal, soybean meal, soybean vines, distillers' solubles, distiller' dried grains, corn meal, peanut meal, peanut flour, oat hulls, rice hulls, oatmeal, corn stalks, corn cobs, kudzu vines, sorgo stalks, sorghum stalks, beet pulp, sweet potato vines, sweet potatoes, Irish potatoes, and cotton seed meal with one or more strains of active micro-organisms selected from the group consisting of *Bacillus subtilis*, *Bacillus mesentericus*, and *Bacillus vulgatus*, and aerobically incubating the inoculated substrate for a period of from about 15 hours to about 72 hours at a temperature of from about 70° F. to about 130° F. to produce a growth-promoting factor, and then drying the inoculated substrate and growth-promoting factor at a temperature insufficient to destroy the nutrient and growth-promoting qualities thereof, sufficiently to substantially inhibit further growth of the micro-organisms.

8. A method of correcting the vitamin deficiency of an all-vegetable diet which comprises the step of adding to an edible all-vegetable material a physiologically significant amount of the growth factor produced by the action of one or more strains of bacteria selected from the group consisting of *Bacillus subtilis*, *Bacillus mesentericus* and *Bacillus vulgatus* when allowed to aerobically grow at a temperature of from about 70° F. to about 130° F. on a moist nutrient substrate up to the point of hydrolyzation of the substrate.

9. A process of producing a growth-promoting factor which comprises the steps of inoculating a moist nutrient medium with one or more strains of *Bacillus subtilis*, aerobically incubating the inoculated medium for from about 15 to 72 hours at a temperature within the range 70° F. to 130° F. and thereafter recovering the growth-promoting factor resulting from the action of the bacteria.

10. A process of producing a growth-promoting factor which comprises the steps of inoculating a moist nutrient medium with one or more strains of *Bacillus vulgatus*, aerobically incubating the inoculating medium for from about 15 to 72 hours at a temperature within the range 70° F. to 130° F. and thereafter recovering the growth-promoting factor resulting from the action of the bacteria.

11. A process of producing a growth-promoting factor which comprises the steps of inoculating a moist nutrient medium with one or more strains of *Bacillus mesentericus*, aerobically incubating the inoculated medium for from about 15 to 72 hours at a temperature within the range 70° F. to 130° F. and thereafter recovering the growth-promoting factor resulting from the action of the bacteria.

References Cited in the file of this patent

UNITED STATES PATENTS

| Number | Name | Date |
| --- | --- | --- |
| 2,256,914 | Whitcomb | Sept. 23, 1941 |
| 2,450,318 | Wagamon | Sept. 28, 1948 |
| 2,504,067 | Colingsworth | Apr. 11, 1950 |
| 2,515,135 | Petty | July 11, 1950 |
| 2,563,794 | Rickes | Aug. 7, 1951 |
| 2,643,213 | Hall | June 23, 1953 |
| 2,681,881 | Bennett | June 22, 1954 |